US00RE44591E

(19) United States
(12) Reissued Patent
Kim et al.

(10) Patent Number: US RE44,591 E
(45) Date of Reissued Patent: *Nov. 12, 2013

(54) APPARATUS FOR MAKING A RANDOM ACCESS TO THE REVERSE COMMON CHANNEL OF A BASE STATION IN CDMA AND METHOD THEREFOR

(75) Inventors: Tae Joong Kim, Seongnam-shi (KR); Seung Chan Bang, Seo-gu (KR); Ki Chul Han, Daejon (KR)

(73) Assignee: Electronics and Telecommunications Research Institute, Daejeon (KR)

( * ) Notice: This patent is subject to a terminal disclaimer.

(21) Appl. No.: 13/529,398

(22) Filed: Jun. 21, 2012

Related U.S. Patent Documents

Reissue of:
(64) Patent No.: 6,614,771
Issued: Sep. 2, 2003
Appl. No.: 09/181,970
Filed: Oct. 29, 1998

U.S. Applications:
(63) Continuation of application No. 11/951,939, filed on Dec. 6, 2007, and a continuation of application No. 11/218,277, filed on Sep. 2, 2005, now Pat. No. Re. 40,253.

(30) Foreign Application Priority Data

May 4, 1998 (KR) ..... 98-16019

(51) Int. Cl.
*H04B 7/216* (2006.01)
*H04J 3/06* (2006.01)
*H04J 3/16* (2006.01)

(52) U.S. Cl.
CPC ..... *H04J 3/16* (2013.01)
USPC ..... 370/335; 370/350

(58) Field of Classification Search
CPC ..... H04J 3/00; H04J 3/16
USPC ..... 370/320, 328, 329, 335, 337, 321, 341, 370/342, 347, 350, 503, 509, 510, 512
See application file for complete search history.

(56) References Cited

U.S. PATENT DOCUMENTS 4,901,307 A 2/1990 Gilhousen et al.
5,309,474 A 5/1994 Gilhousen et al.
(Continued)

FOREIGN PATENT DOCUMENTS

CN 1133658 10/1996
DE 197 08 626 9/1998
(Continued)

OTHER PUBLICATIONS

3GPP (S1.13) V1.0.1 1999-3, European Telecommunications Institute, 1998.
(Continued)

*Primary Examiner* — Hanh N Nguyen
(74) *Attorney, Agent, or Firm* — Hunton & Williams LLP

(57) ABSTRACT

An apparatus for making a plurality of terminals have a random access to the reverse common channel system in CDMA, comprises code synchronization detection information broadcast means provided in the base station for broadcasting the state information of a channel card in real time for the terminals to recognize the code synchronization detection when the code synchronization of a certain data is acquired through performing the code synchronization of the preambles transmitted from the terminals through the reverse common channel, and data transmission determination means provided in the terminals for making the terminals to have attempted data transmission in the same time slot with the data of the code synchronization detection continuously transmit data and the other terminals stop data transmission.

53 Claims, 5 Drawing Sheets

(56) References Cited

U.S. PATENT DOCUMENTS

| | | | | |
|---|---|---|---|---|
| 5,327,455 | A | 7/1994 | De Gaudenzi et al. | |
| 5,414,728 | A | 5/1995 | Zehavi | |
| 5,416,797 | A | 5/1995 | Gilhousen et al. | |
| 5,515,396 | A | 5/1996 | Dalekotzin | |
| 5,530,700 | A | 6/1996 | Tran et al. | |
| 5,537,397 | A | 7/1996 | Abramson | 370/18 |
| 5,577,025 | A | 11/1996 | Skinner et al. | |
| 5,613,211 | A | 3/1997 | Matsuno | |
| 5,619,526 | A | 4/1997 | Kim et al. | |
| 5,691,974 | A | 11/1997 | Zehavi et al. | |
| 5,721,733 | A | 2/1998 | Wang et al. | 370/332 |
| 5,734,647 | A | 3/1998 | Yoshida et al. | |
| 5,751,761 | A | 5/1998 | Gilhousen | |
| 5,809,060 | A | 9/1998 | Cafarella et al. | |
| 5,818,867 | A | 10/1998 | Rasmussen et al. | |
| 5,828,662 | A | 10/1998 | Jalai et al. | |
| 5,838,669 | A * | 11/1998 | Gerakoulis | 370/320 |
| 5,870,378 | A | 2/1999 | Huang et al. | |
| 5,883,887 | A | 3/1999 | Take et al. | |
| 5,926,500 | A | 7/1999 | Odenwalder | |
| 6,028,868 | A * | 2/2000 | Yeung et al. | 370/515 |
| 6,078,572 | A * | 6/2000 | Tanno et al. | 370/335 |
| 6,084,884 | A | 7/2000 | Adachi | |
| 6,091,717 | A * | 7/2000 | Honkasalo et al. | 370/329 |
| 6,233,271 | B1 | 5/2001 | Jones et al. | |
| 6,240,083 | B1 * | 5/2001 | Wright et al. | 370/348 |
| 6,259,724 | B1 * | 7/2001 | Esmailzadeh | 375/143 |
| 6,324,159 | B1 | 11/2001 | Mennekens et al. | |
| 6,393,047 | B1 | 5/2002 | Popovic | |
| 6,473,449 | B1 | 10/2002 | Cafarella et al. | |
| 6,580,747 | B1 | 6/2003 | Lipponen | |
| 6,614,771 | B1 * | 9/2003 | Kim et al. | 370/335 |
| 6,741,550 | B1 | 5/2004 | Shin | |
| 6,882,841 | B1 | 4/2005 | Youn | |
| RE40,253 | E * | 4/2008 | Kim et al. | 370/335 |
| RE40,385 | E | 6/2008 | Bang et al. | |

FOREIGN PATENT DOCUMENTS

| | | |
|---|---|---|
| EP | 0 783 210 | 7/1997 |
| EP | 0 814 581 | 12/1997 |
| EP | 0 918 410 | 5/1999 |
| EP | 0 921 652 | 6/1999 |
| WO | WO 99/03225 | 10/1987 |
| WO | WO 92/17011 | 10/1992 |
| WO | WO 95/03652 | 2/1995 |
| WO | WO 99/59265 | 11/1996 |
| WO | WO 97/47098 | 6/1997 |
| WO | WO 98/38337 | 2/1998 |
| WO | WO 99/03224 | 1/1999 |
| WO | WO 00/42752 | 7/2000 |

OTHER PUBLICATIONS

4th ARIB-TTA Meeting on IMT—2000 Standardation.

Chih, et al., "Performance of Multi-Code CDMA Wireless Communications Networks", IEEE (1995).

Da Silva, "Multicarrier Orthogonal CDMA Signals For Quasi-Synchronous Communication Systems" Dowloaded Feb. 13, 2010.

Freiberg, et al., "Crest Factor Reduction Using Orthogonal Spreading Codes in Multi-Carrier CMDA Systems", Dept. of Electrical and Computer Engineering, University of Victoria.

Garg, et al., "Third Generation (3G) Mobile Communications Systems" Bell Labs, Lucent Technologies, Naperville, IL, Downloaded Feb. 9, 2010.

IMT—2000 Cooperative Activities Between ARIB and TTA [Draft].

Ishida, et al. "Immediate Transmission Scheme of s-Aloha with PCT (Power Control during Transmission) Method", Downloaded Feb. 20, 2010, 4 pages.

ITU Workshop on IMT-2000 Transmission Technologies, Toronto, Sep. 10-11, 1997.

Kalet "The Radio Interface", CDMA IS 1995, Qualcomm.

Kim, et al., "A Coherent Dual Channel QPSK Modulation for CDMA System".

Kim, et al., "A Coherent Dual Channel QPSK Modulation For The Reverselink In A CDMA System".

Laird, et al., "A Peak-To-Average Power Reduction Method For Third Generation CDMA Reverse Links" Downloaded Feb. 9, 2010.

Lang, et al., "Comparison of Correlation Parameters of Binary Codes For DS/CDMA Systems" Dept. of Electrical Engineering, University of Singapore, Downloaded Feb. 13, 2010.

Ling "Analysis of Performance and Capacity of Coherent DS-CDMA Reverse Link Communications", IEEE (1995).

Multichannel Reservation Protocol for Packet Multiple-Access Communications, Downloaded Feb. 20, 2010.

Ochiai, et. al, "OFDM-CDMA with Peak Power Reduction Based On The Spreading Sequences", Institute of Industrial Science, University of Tokyo.

Ovesjo, et al. "Frames Multiple Access Mode 2—Wideband CDMA" Downloaded Feb. 9, 2010.

Popovik, et al., "Efficient Despreaders for Multi-Code CDMA Systems", Ericsson Radio Systems, Downloaded Feb. 13, 2010.

Spreading and Modulation (FDD) TS 25.213 V2.0.0 (1999-4).

Submission of Proposed Radio Transmission Technologies.

The CDMA Engineering Handbook, vol. 1: Concepts in CDMA, Nov. 23, 1992.

Translator's Declaration of Kim, et al., "A Coherent Dual Channel QPSK Modulation For The Reverselink In A CDMA System".

TSG-RAN Working Group 1 Meeting #4 Amplitude Differences Between Uplink DPCCH and DPDCHs, Apr. 1999.

TSG-RAN Working Group 1 Meeting #5 Ad Hoc #10 Report.

TSG-RAN Working Group 1 Meeting #5 FDD Mode Uplink OSVF Code Choice.

TSG-RAN Working Group 1 Meeting #6 Channelization Code Allocation in Uplink Multi-Code Trasmissions: Jul. 1999.

W-CDMA Uplink Spreading and Modulation, ETSI SMG 2 Workshop, Mar. 1998.

Weiping, et al., "Throughput Delay Analysis of a Multi-Channel Packet CDMA Scheme in a Fading Environment", Dept. of Electrical and Computer Engineering, University of California, San Diego, Downloaded Feb. 20, 2010.

Yip, et al., "Performance Sensitivity of Quasi-Synchronous, Multicarrier DS-CDMA Systems Due to Carrier Frequency Disturbance", Dept. of Electronic and Electrical Engineering, University of Hong Kong, Downloaded Feb. 13, 2010.

Zahari, et al., "The PCS CDMA System Overview", IEEE, Apr. 1994.

Tae-Joon Kim, et al. "On Performance Improvements of Spread Slotted Aloha Network with CLSP/CC", IEICE Trans Fundamentals, vol. E80-A, No. 12 Dec. 1997, pp. 24932499.

Kiyoshi Toshimitsu, et al. "A Novel Spread Slotted Aloha System with Channel Load Sensing Protocol", IEEE Journal on Selected Areas in Communications, vol. 12, No. 4, May 1994.

Masato Saito, et al. "Throughout Improvement of CDMA Slotted ALOHA Systems", IEICE Trans. Commun, vol. E80-B, No. 1 Jan. 1997, pp. 74-79.

* cited by examiner

APPARATUS FOR MAKING A RANDOM ACCESS TO THE REVERSE COMMON CHANNEL OF A BASE STATION IN CDMA AND METHOD THEREFOR

Matter enclosed in heavy brackets [ ] appears in the original patent but forms no part of this reissue specification; matter printed in italics indicates the additions made by reissue.

*NOTE: More than one reissue application has been filed for the reissue of U.S. Pat. No. 6,614,771. The reissue applications are U.S. patent application Ser. No. 11/218,277, filed on Sep. 2, 2005; U.S. patent application Ser. No. 11/951,939, filed on Dec. 6, 2007, which is a continuation reissue application of U.S. patent application Ser. No. 11/218,277 filed Sep. 2, 2005; U.S. patent application Ser. No. 13/406,781, filed on Feb. 28, 2012, which is a continuation reissue application of U.S. patent application Ser. No. 11/951,939 filed Dec. 6, 2007 and the current application being filed on Jun. 21, 2012.*

BACKGROUND OF THE INVENTION

1. Field of the Invention

The present invention concerns an apparatus for making a plurality of cellular phones randomly access a common channel to transmit data in CDMA (Code Division Multiple Access), and a method therefor.

2. Technical Background

Recently, it has been demanded that the mobile communication system may provide data communication services to enable exchanges of moving image and character data together with those of conventional voiced information during movement. IMT-2000 (International Mobile Telecommunication-2000) is an international project to develop a mobile communication system to enable such data communication services based on an internationally integrated standard. In addition, an effort has been made to achieve high speed data transmission with some limitation in the mobile characteristics, and particularly, the wireless LAN proposed in IEEE 802.11 standard is commercially able to make data transmission at 2 Mbps (Mega bit per sec).

Generally, the circuit-switch, which is employed in the present public switched telephone network (PSTN), digital cellular system and personal communication system, is not desirable to make such high speed data transmission because of ineffectively using a limited number of channels. In order to resolve the disadvantages of the circuit-switch, the packet-switch has been proposed to make high speed data transmission in IMT-2000, which is under development for LAN or the standard of the future mobile communication system. The band spread method of CDMA applied to the present digital cellular system has a large communication capacity, and is prevented from external tapping and stabilized to make communications under the multipath environment generated by the radio channels rapidly changed through movement, so that it is widely used in the commercial wireless LAN, CDMA One of LMNQ (Lucent Motorola, Nortel, Qualcomm, Samsung) proposed as the standard of the future IMT-2000, or W-CDMA (Wideband-CDMA) chiefly developed in Europe and Japan.

The future IMT-2000 system is to support both voiced data and packet data communications. In this case, it is very ineffective that the packet data is assigned with an exclusive channel as the voiced data. Namely, although the continuous voiced data must be assigned with an exclusive channel, it is desirable for effective use of resources and simplification of the system that the discontinuous small packet data are transmitted through the reverse common channels less than the number of the active terminals. Moreover, if the number of the subscribers is increased, and thus the amount of the data transmitted, the reverse common channels must be necessarily used for the effective use of resources.

The ALOHA method is the most effective way of channel access and data transmission through the reverse common channel, and a typical random access, which is developed by Hawaii University in 1970 as a protocol for the wireless network between the islands of Hawaii State. However, such ALOHA suffers the inefficiency of data transmission performed without any timed schedule between the base station and terminals, and network overloaded due to frequent collision of data transmitted by a number of terminals. The slotted ALOHA has been developed to define a standard time between the base station and terminal in order to cope with such problems. This method is in allow the data transmission of a terminal only in a set time, so that the rate of substantial data and thus the transmission efficiency is increased, and the interferences from another terminal is reduced, thereby improving the efficiency of the whole network. However, since the slotted ALOHA makes the data transmission basically in the contention mode, it is impossible to avoid collisions of data transmitted from the terminals. Hence, if there is an additional channel for controlling and transmitting information in the forward link from the base station to the terminals, the base station broadcasts the information of the received data to the terminals in order to avoid such data collision.

In the ALOHA system employing CDMA, each terminal uses a different code or the same code with a time offset to avoid data collision. In addition, a preamble signal is firstly transmitted to determine the power to be used for data transmission, and the initial synchronization with the code to use and the tracking of the code synchronization is performed previous to the data transmission, thereby preventing data transmission error. Describing the conventional ALOHA protocol employing CDMA in reference to FIG. 1, a terminal makes an access attempt to transmit data. The access attempt consists of a plurality of access sub-attempts, each of which in turn consists of a plurality of access probe sequences, each of which in turn consists of a plurality of access probes. The access probe consists of a preamble transmitting a pilot channel without any substantial information to evaluate the channel situation and to make the initial synchronization between the codes of the terminal and base station and the tracking of the code synchronization, and an access channel message capsule containing the access information or the user's data following the preamble. In order to transmit an access signal or data through the reverse common channel, a terminal firstly transmits an access probe at a given power level, which must have a minimum value to reduce the interferences affecting the other terminals that transmit data through an exclusive channel or other reverse common channels. Then, the terminal which made an attempt to transmit data with the first access probe waits for a prescribed time interval TA the signal from the base station representing whether the transmitted data is received. If the first access probe fails to reach the base station, the terminal makes another attempt to retransmit the second probe at a power level increased by a given level PI compared to the power level of the first probe after a random time interval RT. If not succeeding in the data transmission through a prescribed number of the access probes of the first access probe sequence, the terminal performs the second access probe sequence after passing an additional random time interval RS.

While the conventional ALOHA protocol system employing CDMA can make a stable data transmission in the reverse common channel by performing stably the code synchronization and the tracking thereof with the preamble of a sufficient length even when many data are transmitted through the reverse common channel, the preamble is the signal to establish the code synchronization, and less important and longer than the substantial data. Thus, if the synchronization is exactly acquired in the preamble but with an error in transmission of the substantial data, the preamble should be retransmitted reducing the data transmission efficiency.

SUMMARY OF THE INVENTION

It is an object of the present invention to provide an apparatus for making a plurality of cellular phones randomly access a common channel to transmit data in CDMA, which enables the base station to broadcast a signal representing whether it has acquired the synchronization signal of the data received through the reverse common channel or no, so as to prevent the terminals from unnecessarily transmitting data, thereby avoiding interference signals generated in the reverse common channel.

It is another object of the present invention to reduce the power used in the terminal to employ an exclusive channel or the reverse common channel to transmit data, and to enable the failed terminal to quickly retransmit data.

It is still another object of the present invention to provide an apparatus for making a plurality of cellular phones randomly access a common channel to transmit data in CDMA, which may stably perform the code synchronization and the tracking thereof with a preamble of the same length, and achieve reliable data transmission, and reduce the time taken for transmitting data.

It is further another object of the present invention to enable the base station to broadcast the information concerning the state of the channel card to all terminals in real time so as to prevent the terminals from unnecessarily transmitting data.

According to the present invention, an apparatus for making a plurality of terminals have a random access to the reverse common channel of a base station in CDMA, comprises code synchronization detection information broadcast means provided in the base station for broadcasting the state information of a channel card in real time for the terminals to recognize the code synchronization detection when the code synchronization of a certain data is acquired through performing the code synchronization of the preambles transmitted from the terminals through the reverse common channel, and data transmission determination means provided in the terminals for making the terminals to have attempted data transmission in the same time slot with the data of the code synchronization detection continue data transmission and the other terminals stop data transmission.

According to an aspect of the present invention, each of the terminals comprises a data generator for generating the data transmitted to the base station, a data transmitter for transmitting the data generated from the data generator, a terminal RF signal processor for converting the data from the data transmitter into an RF signal transmitted to the base station and for processing an RF signal received from the base station, a broadcast signal receiver for receiving a broadcast signal from the terminal RF signal processor to determine the data transmission, and data transmission determination circuit for controlling the data transmitter to determine whether to make an attempt of transmitting data or to keep on transmitting the data presently under transmission according to the broadcast signal.

When the data transmission determination circuit receives a broadcast signal representing the detection of the code synchronization in a time slot from the base station, it holds the data transmission until receiving a broadcast signal representing the code synchronization not acquired when it does not perform data transmission or keeps on transmitting data when it has attempted the data transmission in the time slot corresponding to the broadcast signal or stops the data transmission performed in the time slot not corresponding to the broadcast signal and holds it until receiving a broadcast signal representing the code synchronization not acquired.

Preferably, the data transmission determination circuit determines the data transmission by receiving the broadcast signal representing the detection of the code synchronization in a time slot from the base station, the data transmission being determined by the first or second broadcast signal according as the ratio of the packet length to the slot length is 2 or 4.

The data transmitter is preferably designed to have a transmitted data unit consisting of the preamble and user's data, and the power of the preamble is set different from that of the user's data. The data transmitter performs the power control according to the power control bit transmitted after receiving the broadcast signal representing the detection of the received signal synchronization from the base station, and maintains a constant power level regardless of the power control bit transmitted upon receiving the broadcast signal representing the received signal synchronization not acquired from the base station.

The base station preferably comprises a base station RF signal processor for receiving the RF signal transmitted from the terminal, a data transceiver for demodulating the signal from the base station RF signal processor to deliver it to an upper hierarchy or another network or vice versa, the data transceiver generating a signal representing whether the received signal synchronization is acquired or no, a detection determination circuit for receiving the resultant signal of the code synchronization used to determine whether the received signal is acquired or no upon completing the preamble of the data transmitted from the data transceiver, a broadcast determination circuit for determining the information to broadcast to the terminals according to the detection of the received signal synchronization recognized by the detection determination circuit, and a broadcast transmitter for controlling the base station RF signal processor to transmit the broadcast signal determined by the broadcast determination circuit at a prescribed power level in a prescribed time.

Preferably, the detection determination circuit determines the initial code synchronization and the tracking of the synchronization in a given time before completion of a preamble transmission to make the terminals perform the precise operation in the beginning of the slot. In addition, the detection determination circuit searches the codes around the beginning of each time slot for a duration that may vary from the length of the time slot to the length of the preamble.

The broadcast determination circuit determines the broadcast signal only with a single bit representing the detection of the synchronization in the preamble. The broadcast transmitter transmits the broadcast signal determined by the broadcast determination circuit through an additional channel using a different code other than the presently used code at every time of completing the slot. Besides, the broadcast transmitter transmits the broadcast signal determined by the broadcast determination circuit at every time of completing the slot in the punctured form having the power control bit transmitted through the pilot channel and a time offset.

The present invention will now described more specifically with reference to the drawings attached only by way of examples.

BRIEF DESCRIPTION OF THE ATTACHED DRAWINGS

DETAILED DESCRIPTION OF PREFERRED EMBODIMENTS

Figure 1:
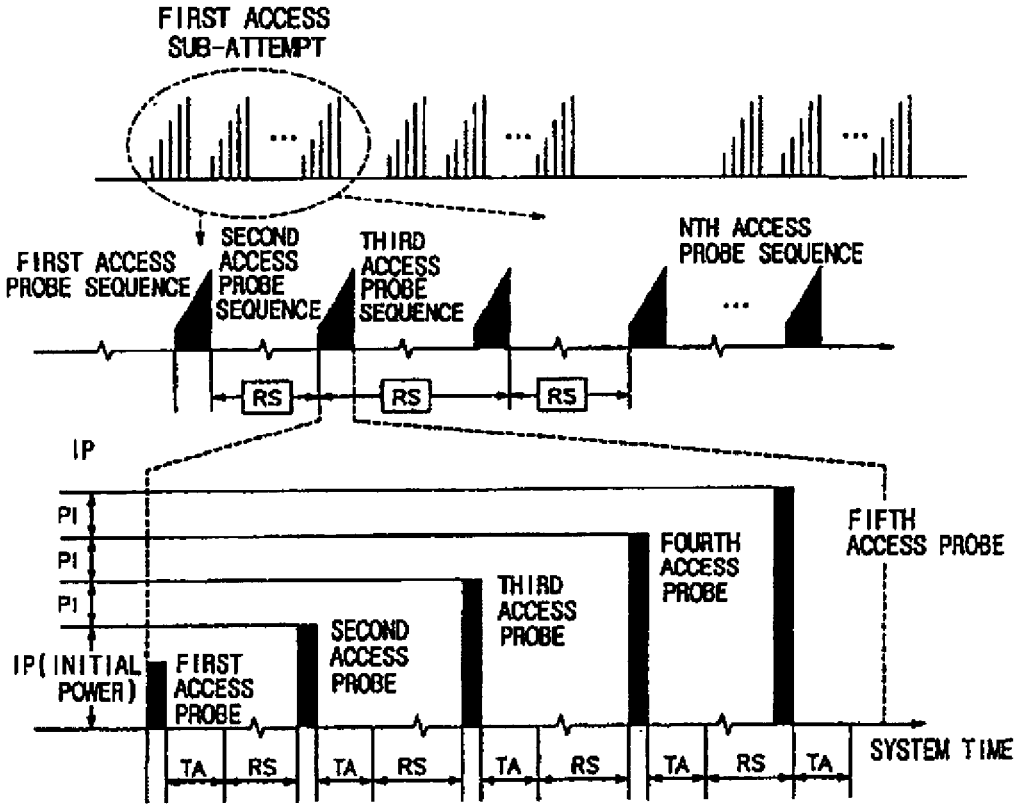
FIG. 1 PRIOR ART
FIG. 1 is a schematic diagram for illustrating the data transmission in ALOHA system employing a common channel in conventional CDMA.
Figure 2:
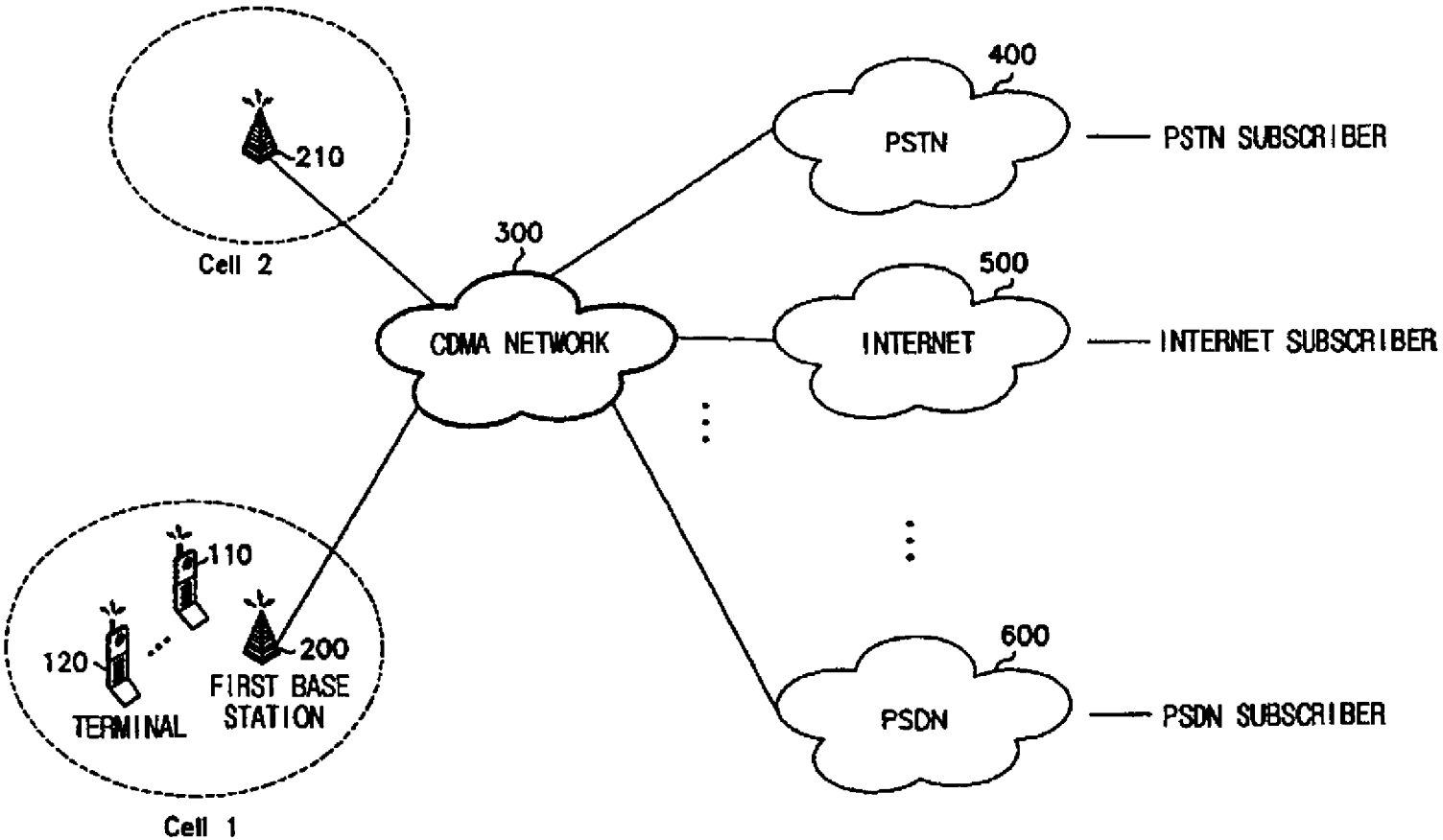
FIG. 2 illustrates a CDMA network where the inventive apparatus is applied.

Referring to FIG. 2, the subscriber's terminal 110 transmits a preamble through the reverse common channel to the base station, which performs the code synchronization to receive the data generated from the terminal, CDMA network 300 controls a plurality of base stations 200, 210, communicating with other networks. PSTN (Public Switched Telephone Network) 400 also communicates with the CDMA network 300 to connect the mobile terminal 110 with the telephone subscriber. Internet 500 also communicates with the CDMA network 300 to connect the terminal 110 with the Internet subscriber. PSDN (Public Switched Data Network) 600 communicates with the CDMA network 300 to connect the terminal 110 with the PSDN subscriber.

The base station 200 is provided with code synchronization detection information broadcast means for broadcasting the state information of a channel card in real time for the terminals to recognize the code synchronization detection when the code synchronization of a certain data is acquired through performing the code synchronization of the preambles transmitted from the terminals through the reverse common channel. In addition, each terminal 100 is provided with data transmission determination means for making the terminals to have attempted data transmission in the same time slot with the data of the code synchronization detection continue data transmission and the other terminals stop data transmission.

Figure 3:
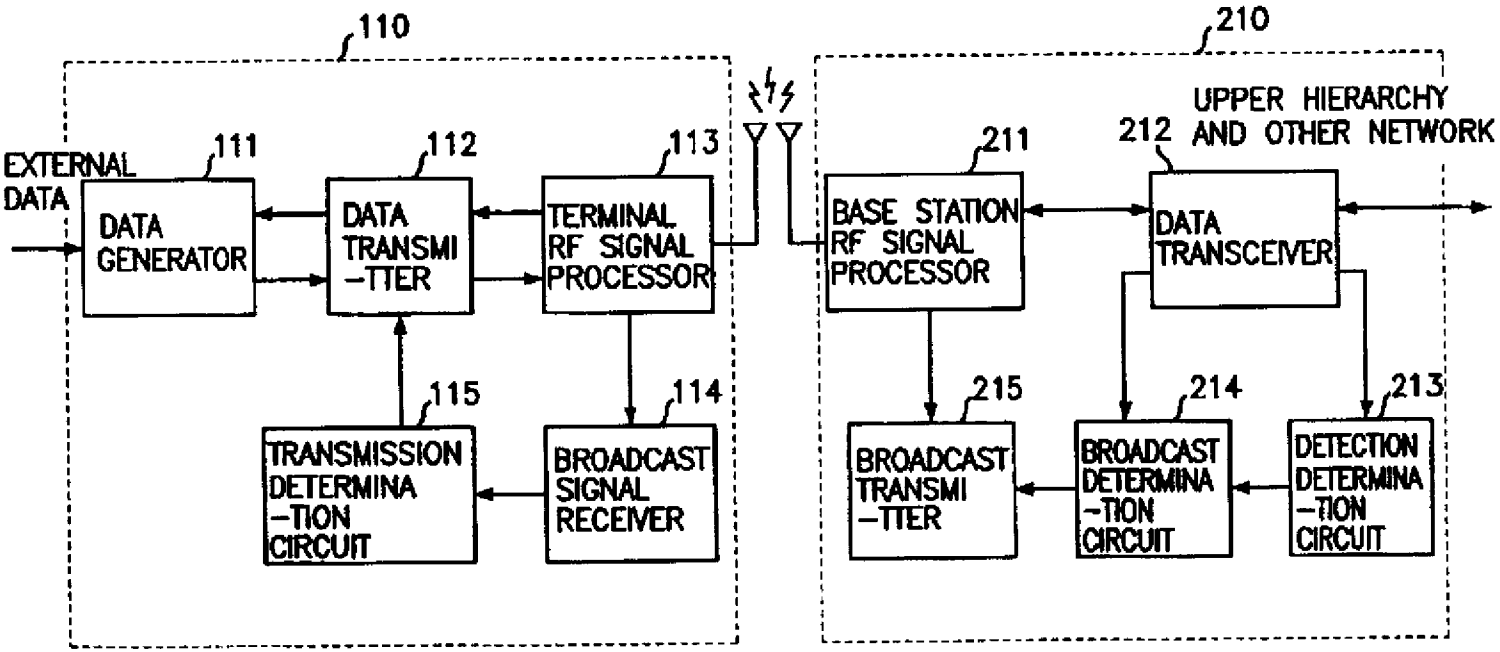
FIG. 3 is a block diagram for illustrating the base station communicating with the terminal according to the inventive apparatus.

As shown in FIG. 3, the terminal 110 comprise a data generator 111 for generating the data transmitted to the base station 210, a data transmitter 112 for transmitting the data generated from the data generator, a terminal RF signal processor 113 for converting the data from the data transmitter 112 into an RF signal transmitted to the base station 210 and for processing an RF signal received from the base station 210, a broadcast signal receiver 114 for receiving a broadcast signal from the terminal RF signal processor 113 to determine the data transmission, and data transmission determination circuit 115 for controlling the data transmitter 112 to determine whether to make an attempt of transmitting data or to keep on transmitting the data presently under transmission according to the broadcast signal.

The base station 210 preferably comprises a base station RF signal processor 211 for receiving the RF signal transmitted from the terminal 110, a data transceiver 212 for demodulating the signal from the base station RF signal processor 211 to deliver it to an upper hierarchy or another network or vice versa, the data transceiver 212 generating a signal representing whether the received signal synchronization is acquired or no, a detection determination circuit 213 for receiving the resultant signal of the code synchronization used to determine whether the received signal is acquired or no upon completing the preamble of the data transmitted from the data transceiver 212, a broadcast determination circuit 214 for determining the information to broadcast to the terminals according to the detection of the received signal synchronization recognized by the detection determination circuit 213, and a broadcast transmitter 215 for controlling the base station RF signal processor 211 to transmit the broadcast signal determined by the broadcast determination circuit 214 at a prescribed power level in a prescribed time.

Describing the operation of the inventive apparatus in connection with FIGS. 3 and 4, the data generator 111 of the terminal 110 generates the data consisting of a control signal to connect the terminal 110 with the base station 210 and a substantial data transmitted by the user of the terminal 110. The data may be transmitted through an exclusive channel or the reverse common channel according to the traffic characteristics. In the inventive apparatus, the data is transmitted through the reverse common channel. The data generated from the data generator is determined to be transmitted or not according to the broadcast signal received from the base station 210.

The hub RF signal processor 211 of the base station 210 converts the RF signal into the base band signal transmitted to the data transceiver 212, which performs the initial code synchronization and the tracking thereof through the preamble of the data received the reverse common channel. Generally speaking, while the initial code synchronization and the tracking thereof may be determined after completing of the preamble receiving, the probability to achieve the code synchronization may be approximately evaluated by means of the power of the received signal even before completion of the preamble receiving, so that the broadcast signal may be determined prior to completion of the preamble transmission, and therefore the time taken for determining and transmitting the broadcast signal may be reduced, thus making it possible to broadcast in real time. Hence, the effect of broadcasting thus determined broadcast signal to all terminals prevents the interference signals because the other terminals are stopped to transmit data when the code synchronization has been attained.

Consequently, the base station 210 decodes the data received through the reverse common channel to make an error detection, and broadcasts the signal representing the detection of the code synchronization of the received data to the terminals in real time. Namely, the detection determination circuit 213 transfers the resultant signal of the code synchronization detection of the received signal from the data transceiver 212 after completion of the preamble to the broadcast determination circuit 214, which determines the preparation to demodulate the data according to the signal from the data transceiver 212 representing demodulation such as the signal of the synchronization detection and the output signal of the detection determination circuit 213.

Then, the broadcast transmitter 215 transmits the information representing the detection of the code synchronization instead of PCB (Power Control Bit) at the boundary of the time slot in order to transmit in real time the broadcast signal determined by the broadcast determination circuit 214 as transmitting PCB through the pilot channel. The possible time delay, as described above, may occur before transmission of the preamble, and therefore the prepared broadcast signal is broadcast before the beginning of the time slot to prevent the performance degradation.

The terminals 110 determines the subsequent operations depending on the information of the code synchronization received from the base station 210. When the base station 210 transmits the signal representing the detection of the code synchronization of the data transmitted through the reverse common channel in a specific time slot, the terminals that have not transmitted data must hold until the completion of transmitting the acquired data while the terminals that have attempted data transmission in the corresponding time slot keep on transmitting the data. Of course, the terminals that have attempted data transmission in the other time slots must stop the transmission until the completion of transmitting the acquired data.

Figure 4A:
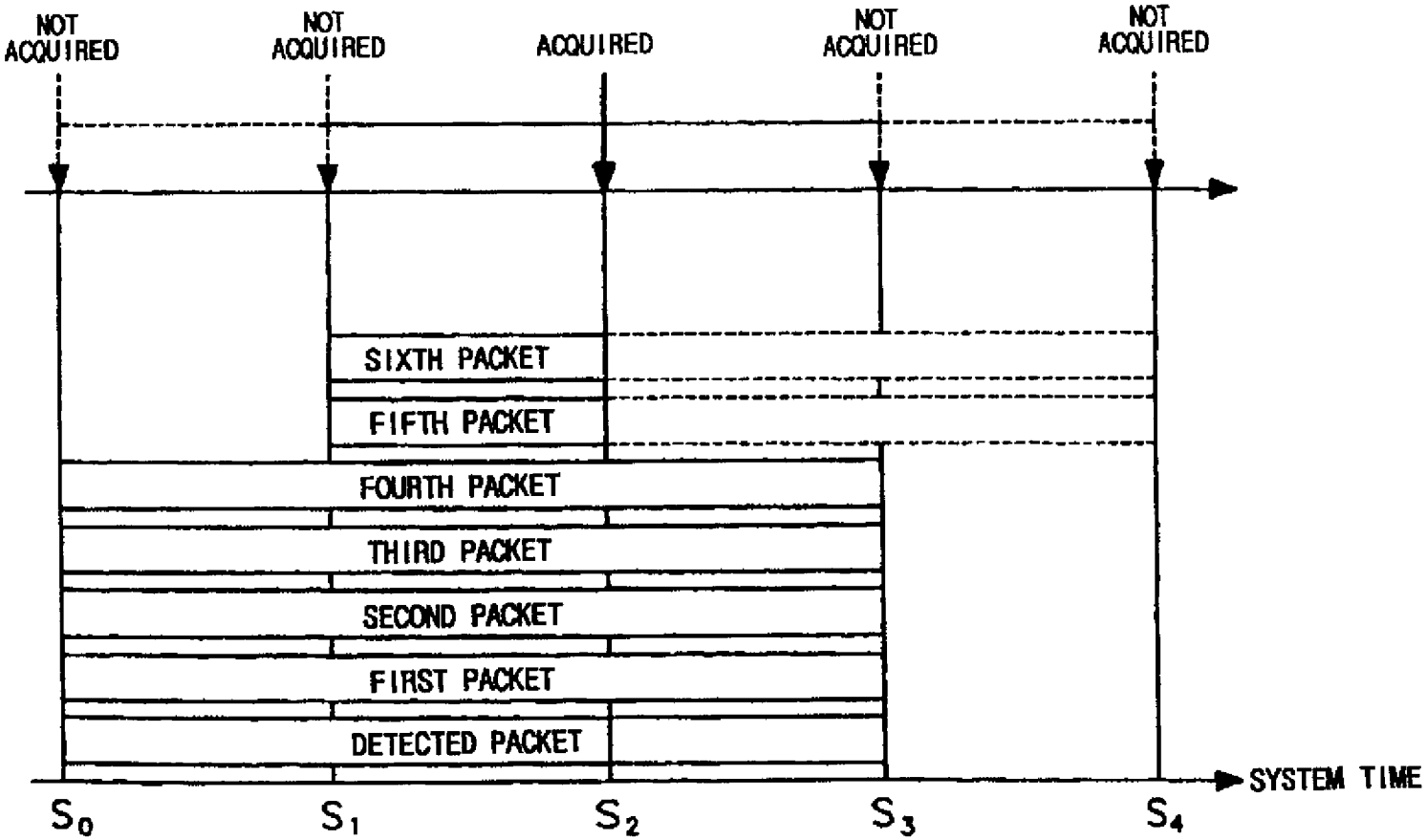
FIG. 4A is a timing diagram for illustrating the random access to the reverse common channel in the inventive apparatus.

FIG. 4A illustrates the example of attempting the data transmission using the beginning of the time slot determined by the system time set in the system. In this case, it is assumed that the length of the preamble necessary for the code synchronization for the data transmission is twice the data length. The time taken for a single data transmission consists of a plurality of time slots. The terminal 110 including the data newly generated or to be retransmitted before the beginning of the first time slot $S_0$ performs the data transmission in the first time slot interval $S_0$-$S_1$. As shown in FIG. 4A, the five data are simultaneously transmitted, and in the next time slot interval $S_1$-$S_2$ are transmitted two data through the reverse common channel to the base station. Hence, the total of the data transmitted in the second time slot interval is seven.

Firstly, it is assumed that the base station performs the initial code synchronization and the tracking thereof by detecting one of the five data transmitted in the first time slot interval $S_0$-$S_1$. This assumption may be taken valid because the data are acquired different in power level or transmission delay even if transmitted simultaneously according to the distance between the base station 200 and the terminal 110. Therefore, as shown in FIG. 4A, the detection of the data transmitted at the beginning of the first time slot $S_0$ is recognized by the base station 200 at the beginning of the third time slot $S_2$, transmitted to all the terminals. Then, the terminal 110 determines the next operation according to the broadcast signal received through the terminal RF signal processor 113 and the broadcast signal receiver 114. Namely, receiving the broadcast signal, the terminals that have made the data transmission at the beginning of the first time slot $S_0$ keep on transmitting data, performing closed loop power control by using the PCB transmitted from this time. Since the previous PCB is invalid due to the preamble not acquired, the closed loop power control of the preamble prior to broadcasting the synchronization detection signal may cause abrupt change to the power generated from the terminal 110.

In the mean time, the terminals that have made data transmission at time points other than the beginning of the first time slot stop the transmission to attempt retransmission in the time slot at which the next not acquired signal is transmitted. On the other hand, if the broadcast signal represents the synchronization not acquired, the terminal does not perform an additional operation, keeping on carrying out the operation done in the previous time slot interval. In this way, the base station may achieve more precise demodulation of the acquired data because of reduced signal interference, transmitting data in the increased power without degradation of the overall system performance. Namely, the data acquired from the preamble may be stably demodulated, so that the time taken for the transmission is reduced and the transmission efficiency is improved.

Figure 4B:
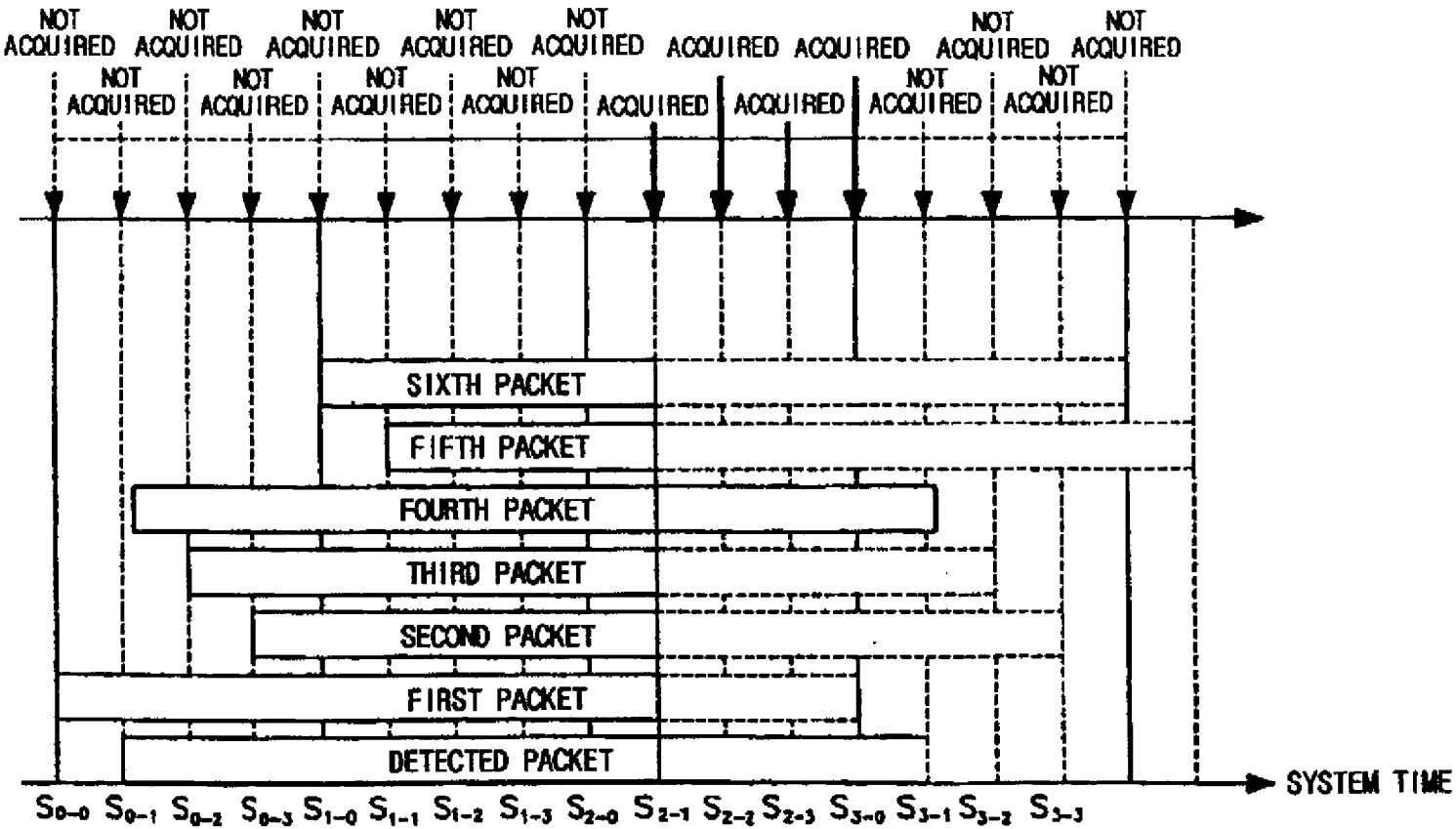
FIG. 4B is a timing diagram for illustrating the random access to the reverse common channel using mini time slots in the inventive apparatus.

FIG. 4B illustrates the data transmission procedure where the length of the time slot is more reduced. The length of the preamble for the code synchronization is twice the data length as in FIG. 4A. In this case, each time slot is divided into a plurality of smaller time slots, so that the number of the terminals 110 is reduced for a time slot. A data is transmitted in the beginning of the first time slot $S_{0-0}$, and two data in the beginning of the next time slot $S_{0-1}$, so that the amount of the data transmitted at the beginning of each time slot is reduced, thus increasing the probability of detecting in the preamble compared to the case of FIG. 4A.

Consequently, the data transmitted in the second time slot $S_{0-1}$ is acquired by the base station 200 to broadcast the detection signal to the terminal 110 in the time slot $S_{2-1}$ of completing the preamble. Receiving the detection signal, the terminals that have performed data transmission in the beginning of the second time slot $S_{0-1}$, keep on transmitting data while the terminals that have performed data transmission in the other time slots stop transmission, holding until the time slot $S_{3-1}$ of receiving the signal not acquired from the base station, and thus the terminals that have not performed data transmission. Compared to FIG. 4A where two of seven terminals stop transmission, the five terminals stop data transmission, and therefore it will be noted that the reduced slot secures the stable data transmission with reduced signal interference. Thus, the reduced slot length reduces the probability of transmitting data in the same time slot, so that there is increased the nubmer of the terminals stopping unnecessary transmission after detection of the preamble. This increases the stability of data transmission, decreasing the signal interference in the terminals using the exclusive channel or other reverse common channels. However, since the signal broadcast from the base station 200 to the terminal 110 is determined by the signal received from the terminal, it is required that the slot length is maintained over a prescribed level to minimize the disadvantages caused by the transmission delay or multi-path. Namely, if the slot length is reduced below the prescribed level to reduce the level of the interference signal, the performance of the overall system is degraded because of increasing the frequency of the signal interference. Hence, it is desirable to select the slot length that may reduce the level of the signal interference with minimizing the disadvantages caused by the transmission delay and multi-path.

In another aspect of the present invention, a method for making a plurality of terminals have a random access to the reverse common channel of a base station in CDMA, comprises the steps of broadcasting from the base station the state information of a channel card in real time for the terminals to recognize the code synchronization detection when the code synchronization of a certain data is acquired through performing the code synchronization of the preambles transmitted from the terminals through the reverse common channel, and making the terminals to have attempted data transmission in the same time slot with the data of the code synchronization detection continue data transmission and the other terminals stop data transmission.

Preferably, the step of making the terminals transmit data comprises the steps of generating the data transmitted to the base station, transmitting the data to the base station, converting the data into an RF signal transmitted to the base station and processing a broadcast RF signal received from the base station, receiving the converted broadcast RF signal to determine the data transmission, and determining whether to make an attempt of transmitting data or to keep on transmitting the data presently under transmission according to the broadcast signal.

Preferably, the step of broadcasting in the base station comprises the steps of receiving the RF signal transmitted from the terminal, demodulating the signal from the base station RF signal processor to deliver it to an upper hierarchy or another network or vice versa, and generating a signal representing whether the received signal synchronization is acquired or no, receiving the resultant signal of the code synchronization used to determine whether the received signal is acquired or no upon completing the preamble of the data transmitted, determining the information to broadcast to the terminals according to the detection of the received signal synchronization, and controlling the base station to transmit the broadcast signal at a prescribed power level in a prescribed time.

Describing the operation of the inventive method in connection with FIG. 4, the data generator of the terminal generates the data consisting of a control signal to connect the terminal with the base station and a substantial data transmitted by the user of the terminal. The data generated from the data generator is determined to be transmitted or not according to the broadcast signal received from the base station.

The hub RF signal processor of the base station converts the RF signal into the base band signal transmitted to the data transceiver, which performs the initial code synchronization and the tracking thereof through the preamble of the data received the reverse common channel. Generally speaking, while the initial code synchronization and the tracking thereof may be determined after completing of the preamble receiving, the probability to achieve the code synchronization may be approximately evaluated by means of the power of the received signal even before completion of the preamble receiving, so that the broadcast signal may be determined prior to completion of the preamble transmission, and therefore the time taken for determining and transmitting the broadcast signal may be reduced, thus making it possible to broadcast in real time. Hence, the effect of broadcasting thus determined broadcast signal to all terminals prevents the interference signals because the other terminals are stopped to transmit data when the code synchronization has been attained.

Consequently, the base station 210 decodes the data received through the reverse common channel to make at error detection, and broadcasts the signal representing the detection of the code synchronization of the received data to the terminals in real time. Namely, the detection determination circuit transfers the resultant signal of the code synchronization detection of the received signal from the data transceiver after completion of the preamble to the broadcast determination circuit, which determines the preparation to demodulate the data according to the signal from the data transceiver representing demodulation such as the signal of the synchronization detection and the output signal of the detection determination circuit. Then, the broadcast transmitter transmits the information representing the detection of the code synchronization instead of PCB at the boundary of the time slot in order to transmit in real time the broadcast signal determined by the broadcast determination circuit as transmitting PCB through the pilot channel.

The terminals determine the subsequent operations depending on the information of the code synchronization received from the base station. When the base station transmits the signal representing the detection of the code synchronization of the data transmitted through the reverse common channel in a specific time slot, the terminals that have not transmitted data must hold until the completion of transmitting the acquired data while the terminals that have attempted data transmission in the corresponding time slot keep on transmitting the data. Of course, the terminals that have attempted data transmission in the other time slots must stop the transmission until the completion of transmitting the acquired data.

FIG. 4A illustrates the example of attempting the data transmission using the beginning of the time slot determined by the system time set in the system. Since the preamble and data constitute a transmission data unit, the performance depends on the power and length of the preamble. Hence, if the transmission data unit is greater than twice the time slot, the inventive effect is achieved, or otherwise, the effect not obtained. The present invention sets the time slot smaller than the conventional time slot to improve the performance. The time taken for a single data transmission consists of a plurality of time slots. The terminal including the data newly generated or to be retransmitted before the beginning of the first time slot $S_0$ performs the data transmission in the first time slot interval $S_0$-$S_1$. As shown in FIG. 4A, the five data are simultaneously transmitted, and in the next time slot interval $S_1$-$S_2$ are transmitted two data through the reverse common channel to the base station. Hence, the total of the data transmitted in the second time slot interval is seven.

Firstly, it is assumed that the base station performs the initial code synchronization and the tracking thereof by detecting one of the five data transmitted in the first time slot interval $S_0$-$S_1$. This assumption may be taken valid because the data are acquired different in power level or transmission delay even if transmitted simultaneously according to the distance between the base station and the terminal. Therefore, as shown in FIG. 4A, the detection of the data transmitted at the beginning of the first time slot $S_0$ is recognized by the base station at the beginning of the third time slot $S_2$, transmitted to all the terminals. Then, the terminal determines the next operation according to the broadcast signal received through the terminal RF signal processor and the broadcast signal receiver. Namely, receiving the broadcast signal, the terminals that have made the data transmission at the beginning of the first time slot $S_0$ keep on transmitting data, performing closed loop power control by using the PCB transmitted from this time. Since the previous PCB is invalid due to the preamble not acquired, the closed loop power control of the preamble prior to broadcasting the synchronization detection signal may cause abrupt change to the power generated from the terminal.

In the mean time, the terminals that have made data transmission at time points other than the beginning of the first time slot stop the transmission to attempt retransmission in the time slot at which the next signal not acquired is transmitted. On the other hand, if the broadcast signal represents the synchronization not acquired, the terminal does not perform an additional operation, keeping on carrying out the operation done in the previous time slot interval. In this way, the base station may achieve more precise demodulation of the acquired data because of reduced signal interference, transmitting data in the increased power without degradation of the overall system performance. Namely, the data acquired from the preamble may be stably demodulated, so that the time taken for the transmission is reduced and the transmission efficiency is improved.

FIG. 4B illustrates the data transmission procedure where the length of the time slot is more reduced. The length of the preamble for the code synchronization is twice the data length as in FIG. 4A. In this case, each time slot is divided into a plurality of smaller time slots, so that the number of the terminals is reduced for a time slot. A data is transmitted in the beginning of the first time slot $S_{0-0}$, and two data in the beginning of the next time slot $S_{0-1}$, so that the amount of the data transmitted at the beginning of each time slot is reduced, thus increasing the probability of detecting in the preamble compared to the case of FIG. 4A.

Consequently, the data transmitted in the second time slot $S_{0-1}$ is acquired by the base station to broadcast the detection signal to the terminal in the time slot $S_{2-1}$ of completing the preamble. Receiving the detection signal, the terminals that have performed data transmission in the beginning of the second time slot $S_{0-1}$ keep on transmitting data while the terminals that have performed data transmission in the other time slots stop transmission, holding until the time slot of receiving the signal not acquired from the base station, and thus the terminals that have not performed data transmission. Compared to FIG. 4A where two of seven terminals stop transmission, the five terminals stop data transmission, and therefore it will be noted that the reduced slot secures the stable data transmission with reduced signal interference. Thus, the reduced slot length reduces the probability of transmitting data in the same time slot, so that there is increased the nubmer of the terminals stopping unnecessary transmission after detection of the preamble. This increases the stability of data transmission, decreasing the signal interference in the terminals using the exclusive channel or other reverse common channels. However, since the signal broadcast from the base station to the terminal is determined by the signal received from the terminal, it is required that the slot length is maintained over a prescribed level to minimize the disadvantages caused by the transmission delay or multi-path. Namely, if the slot length is reduced below the prescribed level to reduce the level of the interference signal, the performance of the overall system is degraded because of increasing the frequency of the signal interference. Hence, it is desirable to select the slot length that may reduce the level of the signal interference with minimizing the disadvantages caused by the transmission delay and multi-path.

Thus, the base station broadcasts a signal representing the detection of the synchronization of the data transmitted through the reverse common channel to all terminals to selectively stop unnecessary data transmission, preventing the reverse common channel from being affected by the unnecessary signal interference. This reduces the signal interference in the radio channel to decrease the power used by the terminal performing data transmission through the exclusive or reverse common channel. In addition, the terminals failed in data transmission through the reverse common channel may expediently perform retransmission, reducing delay time. Hence, the inventive apparatus may be properly applied to a high speed data transmission system such as IMT-2000.

What is claimed is:

[1. An apparatus for making a plurality of terminals have a random access to the reverse common channel of a base station in CDMA, comprising:

code synchronization detection information broadcast means provided in said base station for broadcasting the state information of a channel card in real time for said terminals to recognize the code synchronization detection when the code synchronization of a certain data is acquired through performing the code synchronization of the preambles transmitted from said terminals through said reverse common channel; and data transmission determination means provided in said terminals for making the terminals to have attempted data transmission in the same time slot with the data of said code synchronization detection continue data transmission and the other terminals stop data transmission.]

[2. An apparatus for making a plurality of terminals have a random access to the reverse common channel system in CDMA, as defined in claim 1, wherein each of said terminals comprises:

a data generator for generating the data transmitted to said base station;

a data transmitter for transmitting said data generated from said data generator;

a terminal RF signal processor for converting said data from said data transmitter into an RF signal transmitted to said base station and for processing an RF signal received from said base station;

a broadcast signal receiver for receiving a broadcast signal from said terminal RF signal processor to determine the data transmission; and data transmission determination circuit for controlling said data transmitter to determine whether to make an attempt of transmitting data or to keep on transmitting the data presently under transmission according to said broadcast signal.]

[3. An apparatus for making a plurality of terminals have a random access to the reverse common channel system in CDMA, as defined in claim 2, wherein, when said data transmission determination circuit receives a broadcast signal representing the detection of the code synchronization in a time slot from said base station, it holds the data transmission until receiving a broadcast signal representing the code synchronization not acquired when it does not perform data transmission or keeps on transmitting data when it has attempted the data transmission in the time slot corresponding to said broadcast signal or stops the data transmission performed in the time slot not corresponding to said broadcast signal and holds it until receiving a broadcast signal representing the code synchronization not acquired.]

[4. An apparatus for making a plurality of terminals have a random access to the reverse common channel system in CDMA, as defined in claim 3, wherein said data transmission determination circuit determines the data transmission by receiving the broadcast signal representing the detection of the code synchronization in a time slot from said base station, the data transmission being determined by the first or second broadcast signal according as the ratio of the packet length to the slot length is 2 or 4.]

[5. An apparatus for making a plurality of terminals have a random access to the reverse common channel system in CDMA, as defined in claim 2, wherein said data transmitter is designed to have a transmitted data unit consisting of the preamble and user's data, and the power of said preamble is set different from that of said user's data.]

[6. An apparatus for making a plurality of terminals have a random access to the reverse common channel system in CDMA, as defined in claim 2, wherein said data transmitter performs the power control according to the power control bit transmitted after receiving the broadcast signal representing the detection of the received signal synchronization from said base station, and maintains a constant power level regardless of the power control bit transmitted upon receiving the broadcast signal representing the received signal synchronization not acquired from said base station.]

[7. An apparatus for making a plurality of terminals have a random access to the reverse common channel system in CDMA, as defined in claim 1, wherein said base station comprises:

a base station RF signal processor for receiving the RF signal transmitted from the terminal;

a data transceiver for demodulating the signal from said base station RF signal processor to deliver it to an upper hierarchy or another network or vice versa, said data transceiver generating a signal representing whether the received signal synchronization is acquired or no;

a detection determination circuit for receiving the resultant signal of the code synchronization used to determine whether the received signal is acquired or no upon completing the preamble of the data transmitted from said data transceiver;

a broadcast determination circuit for determining the information to broadcast to said terminals according to the detection of the received signal synchronization recognized by said detection determination circuit; and a broadcast transmitter for controlling said base station RF signal processor to transmit the broadcast signal determined by said broadcast determination circuit at a prescribed power level in a prescribed time.]

[8. An apparatus for making a plurality of terminals have a random access to the reverse common channel system in CDMA, as defined in claim 7, wherein said detection determination circuit determines the initial code synchronization and the tracking of the synchronization in a given time before completion of a preamble transmission to make said terminals perform the precise operation in the beginning of the slot.]

[9. An apparatus for making a plurality of terminals have a random access to the reverse common channel system in CDMA, as defined in claim 8, wherein said detection determination circuit searches the codes around the beginning of each time slot for a duration that may vary from the length of the time slot to the length of the preamble.]

[10. An apparatus for making a plurality of terminals have a random access to the reverse common channel system in CDMA, as defined in claim 7, wherein said broadcast determination circuit determines the broadcast signal only with a single bit representing the detection of the synchronization in the preamble.]

[11. An apparatus for making a plurality of terminals have a random access to the reverse common channel system in CDMA, as defined in claim 7, wherein said broadcast transmitter transmits the broadcast signal determined by said broadcast determination circuit through an additional channel using a different code other than the presently used code at every time of completing the slot.]

[12. An apparatus for making a plurality of terminals have a random access to the reverse common channel system in CDMA, as defined in claim 7, wherein said broadcast transmitter transmits the broadcast signal determined by said broadcast determination circuit at every time of completing the slot in the punctured form having the power control bit transmitted through the pilot channel and a time offset.]

[13. An apparatus for making a plurality of terminals have a random access to the reverse common channel system in CDMA, as defined in claim 7, wherein said broadcast transmitter transmits the broadcast signal determined by said broadcast determination circuit through an additional channel using a different code other than the presently use code at the boundary of each time slot.]

[14. A method for making a plurality of terminals have a random access to the reverse common channel of a base station in CDMA, comprising the steps of:

broadcasting from said base station the state information of a channel card in real time for said terminals to recognize the code synchronization detection when the code synchronization of a certain data is acquired through performing the code synchronization of the preambles transmitted from said terminals through said reverse common channel; and making the terminals to have attempted data transmission in the same time slot with the data of said code synchronization detection continue data transmission and the other terminals stop data transmission.]

[15. A method for making a plurality of terminals have a random access to the reverse common channel system in CDMA, as defined in claim 14, wherein the step of making the terminals transmit data comprising the steps of:

generating the data transmitted to said base station;

transmitting said data to said base station;

converting said data into an RF signal transmitted to said base station and processing a broadcast RF signal received from said base station;

receiving the converted broadcast RF signal to determine the data transmission; and determining whether to make an attempt of transmitting data or to keep on transmitting the data presently under transmission according to said broadcast signal.]

[16. A method for making a plurality of terminals have a random access to the reverse common channel system in CDMA, as defined in claim 15, wherein the step of transmission determination comprises the step of holding the data transmission until receiving a broadcast signal representing the code synchronization not acquired when it does not perform data transmission or keeps on transmitting data when it has attempted the data transmission in the time slot corresponding to said broadcast signal or stops the data transmission performed in the time slot not corresponding to said broadcast signal and holds it until receiving a broadcast signal representing the code synchronization not acquired, when receiving a broadcast signal representing the detection of the code synchronization in a time slot from said base station.]

[17. A method for making a plurality of terminals have a random access to the reverse common channel system in CDMA, as defined in claim 16, wherein the step of transmission determination includes the further step of determining the data transmission by receiving the broadcast signal representing the detection of the code synchronization in a time slot from said base station, the data transmission being determined by the first or second broadcast signal according as the ratio of the packet length to the slot length is 2 or 4.]

[18. A method for making a plurality of terminals have a random access to the reverse common channel system in CDMA, as defined in claim 15, wherein the step of data transmission has a transmitted data unit consisting of the preamble and user's data, and the power of said preamble is set different from that of said user's data.]

[19. A method for making a plurality of terminals have a random access to the reverse common channel system in CDMA, as defined in claim 15, wherein the step of data transmission performs the power control according to the power control bit transmitted after receiving the broadcast signal representing the detection of the received signal synchronization from said base station, and maintains a constant power level regardless of the power control bit transmitted upon receiving the broadcast signal representing the received signal synchronization not acquired from said base station.]

[20. A method for making a plurality of terminals have a random access to the reverse common channel in CDMA, as defined in claim 15, wherein the step of broadcasting in said base station comprises the steps of:

receiving the RF signal transmitted from the terminal;

demodulating the signal from said base station RF signal processor to deliver it to an upper hierarchy or another network or vice versa, and generating a signal representing whether the received signal synchronization is acquired or no;

receiving the resultant signal of the code synchronization used to determine whether the received signal is acquired or no upon completing the preamble of the data transmitted;

determining the information to broadcast to said terminals according to the detection of the received signal synchronization; and controlling said base station to transmit the broadcast signal at a prescribed power level in a prescribed time.]

[21. A method for making a plurality of terminals have a random access to the reverse common channel system in CDMA, as defined in claim 14, wherein the step of broadcasting in said base station comprises the steps of:

receiving the RF signal transmitted from the terminal;

demodulating the signal from said base station RF signal processor to deliver it to an upper hierarchy or another network or vice versa, and generating a signal representing whether the received signal synchronization is acquired or no;

receiving the resultant signal of the code synchronization used to determine whether the received signal is acquired or no upon completing the preamble of the data transmitted;

determining the information to broadcast to said terminals according to the detection of the received signal synchronization; and controlling said base station to transmit the broadcast signal at a prescribed power level in a prescribed time.]

[22. A method for making a plurality of terminals have a random access to the reverse common channel system in CDMA, as defined in claim 21, wherein the step of receiving the resultant signal determines the initial code synchronization and the tracking of the synchronization in a given time before completion of a preamble transmission to make said terminals perform the precise operation in the beginning of the slot.]

[23. A method for making a plurality of terminals have a random access to the reverse common channel system in CDMA, as defined in claim 22, wherein the step of receiving the resultant signal searches the codes around the beginning of each time slot for a duration that may vary from the length of the time slot to the length of the preamble.]

[24. A method for making a plurality of terminals have a random access to the reverse common channel system in CDMA, as defined in claim 21, wherein the step of determining the information to broadcast determines the broadcast signal only with a single bit representing the detection of the synchronization in the preamble.]

[25. A method for making a plurality of terminals have a random access to the reverse common channel system in CDMA, as defined in claim 21, wherein the step of controlling said base station transmits the broadcast signal through using a different code other than the presently used code at every time of completing the slot.]

[26. A method for making a plurality of terminals have a random access to the reverse common channel system in CDMA, as defined in claim 21, wherein the step of controlling said base station transmits the broadcast signal at every time of completing the slot in the punctured form having the power control bit transmitted through the pilot channel and a time offset.]

[27. A method for making a plurality of terminals have a random access to the reverse common channel system in CDMA, as defined in claim 21, wherein the step of controlling said base station transmits the broadcast signal through using a different code other than the presently used code at the boundary of each time slot.]

[28. An apparatus for making a plurality of terminals have a random access to the reverse common channel of a base station in CDMA, comprising:

code synchronization detection information broadcast means provided in said base station for broadcasting the state information of a channel card in real time for said terminals to recognize the code synchronization detection when the code synchronization of a certain data is acquired through performing the code synchronization of the preambles transmitted from said terminals through said reverse common channel; and data transmission determination means provided in said terminals for making the terminals to have acquired the code synchronization of the transmitted preambles in said base station continue data transmission and the other terminals stop data transmission, wherein each of said terminals comprises:

a data generator for generating the data transmitted to said base station;

a data transmitter for transmitting said data generated from said data generator;

a terminal RF signal processor for converting said data from said data transmitter into an RF signal transmitted to said base station and for processing an RF signal received from said base station;

a broadcast signal receiver for receiving a broadcast signal from said terminal RF signal processor to determine the data transmission; and data transmission determination circuit for controlling said data transmitter to determine whether to make an attempt of transmitting data or to keep on transmitting the data presently under transmission according to said broadcast signal, wherein, when said data transmission determination circuit receives a broadcast signal representing the detection of the code synchronization in a time slot from said base station, it holds the data transmission until receiving a broadcast signal representing the code synchronization not acquired when it does not perform data transmission or keeps on transmitting data when it has attempted the data transmission in the time slot corresponding to said broadcast signal or stops the data transmission performed in the time slot not corresponding to said broadcast signal and holds it until receiving a broadcast signal representing the code synchronization not acquired.]

[29. An apparatus for making a plurality of terminals have a random access to the reverse common channel of a base station in CDMA, comprising:

code synchronization detection information broadcast means provided in said base station for broadcasting the state information of a channel card in real time for said terminals to recognize the code synchronization detection when the code synchronization of a certain data is acquired through performing the code synchronization of the preambles transmitted from said terminals through said reverse common channel; and data transmission determination means provided in said terminals for making the terminals to have acquired the code synchronization of the transmitted preambles in said base station continue data transmission and the other terminals stop data transmission, wherein each of said terminals comprises:

a data generator for generating the data transmitted to said base station;

a data transmitter for transmitting said data generated from said data generator;

a terminal RF signal processor for converting said data from said data transmitter into an RF signal transmitted to said base station and for processing an RF signal received from said base station;

a broadcast signal receiver for receiving a broadcast signal from said terminal RF signal processor to determine the data transmission; and data transmission determination circuit for controlling said data transmitter to determine whether to make an attempt of transmitting data or to keep on transmitting the data presently under transmission according to said broadcast signal, wherein said data transmitter is designed to have a transmitted data unit consisting of the preamble and user's data, and the power of said preamble is set different from that of said user's data.]

[30. An apparatus for making a plurality of terminals have a random access to the reverse common channel of a base station in CDMA, comprising:

code synchronization detection information broadcast means provided in said base station for broadcasting the state information of a channel card in real time for said terminals to recognize the code synchronization detection when the code synchronization of a certain data is acquired through performing the code synchronization of the preambles transmitted from said terminals through said reverse common channel; and data transmission determination means provided in said terminals for making the terminals to have acquired the code synchronization of the transmitted preambles in said base station continue data transmission and the other terminals stop data transmission, wherein said base station comprises:

a base station RF signal processor for receiving the RF signal transmitted from the terminal;

a data transceiver for demodulating the signal from said base station RF signal processor to deliver it to an upper hierarchy or another network or vice versa, said data transceiver generating a signal representing whether the received signal synchronization is acquired or no;

a detection determination circuit for receiving the resultant signal of the code synchronization used to determine whether the received signal is acquired or no upon completing the preamble of the data transmitted from said data transceiver;

a broadcast determination circuit for determining the information to broadcast to said terminals according to the detection of the received signal synchronization recognized by said detection determination circuit; and a broadcast transmitter for controlling said base station RF signal processor to transmit the broadcast signal determined by said broadcast determination circuit at a prescribed power level in a prescribed time.]

[31. A method for making a plurality of terminals have a random access to the reverse common channel of a base station in CDMA, comprising the steps of:

broadcasting from said base station the state information of a channel card in real time for said terminals to recognize the code synchronization detection when the code synchronization of a certain data is acquired through performing the code synchronization of the preambles transmitted from said terminals through said reverse common channel; and making the terminals to have acquired the code synchronization of the transmitted preambles in said base station continue data transmission and the other terminals stop data transmission, wherein the step of making the terminals transmit data comprising the steps of:

generating the data transmitted to said base station;

transmitting said data to said base station;

converting said data into an RF signal transmitted to said base station and processing a broadcast RF signal received from said base station;

receiving the converted broadcast RF signal to determine the data transmission; and determining whether to make an attempt of transmitting data or to keep on transmitting the data presently under transmission according to said broadcast signal, wherein the step of transmission determination comprises the step of holding the data transmission until receiving a broadcast signal representing the code synchronization not acquired when it does not perform data transmission or keeps on transmitting data when it has attempted the data transmission in the time slot corresponding to said broadcast signal or stops the data transmission performed in the time slot not corresponding to said broadcast signal and holds it until receiving a broadcast signal representing the code synchronization not acquired, when receiving a broadcast signal representing the detection of the code synchronization in a time slot from said base station.]

[32. A method for making a plurality of terminals have a random access to the reverse common channel of a base station in CDMA, comprising the steps of:

broadcasting from said base station the state information of a channel card in real time for said terminals to recognize the code synchronization detection when the code synchronization of a certain data is acquired through performing the code synchronization of the preambles transmitted from said terminals through said reverse common channel; and making the terminals to have acquired the code synchronization of the transmitted preambles in said base station continue data transmission and the other terminals stop data transmission, wherein the step of making the terminals transmit data comprising the steps of:

generating the data transmitted to said base station;

transmitting said data to said base station;

converting said data into an RF signal transmitted to said base station and processing a broadcast RF signal received from said base station;

receiving the converted broadcast RF signal to determine the data transmission; and determining whether to make an attempt of transmitting data or to keep on transmitting the data presently under transmission according to said broadcast signal, wherein the step of data transmission has a transmitted data unit consisting of the preamble and user's data, and the power of said preamble is set different from that of said user's data.]

[33. A method for making a plurality of terminals have a random access to the reverse common channel of a base station in CDMA, comprising the steps of:

broadcasting from said base station the state information of a channel card in real time for said terminals to recognize the code synchronization detection when the code synchronization of a certain data is acquired through performing the code synchronization of the preambles transmitted from said terminals through said reverse common channel; and making the terminals to have acquired the code synchronization of the transmitted preambles in said base station continue data transmission and the other terminals stop data transmission, wherein the step of broadcasting in said base station comprises the steps of:

receiving the RF signal transmitted from the terminal;

demodulating the signal from said base station RF signal processor to deliver it to an upper hierarchy or another network or vice versa, and generating a signal representing whether the received signal synchronization is acquired or no;

receiving the resultant signal of the code synchronization used to determine whether the received signal is acquired or no upon completing the preamble of the data transmitted;

determining the information to broadcast to said terminals according to the detection of the received signal synchronization; and controlling said base station to transmit the broadcast signal at a prescribed power level in a prescribed time.]

[34. An apparatus for transmitting a data packet to a base station in a code division multiple access (CDMA) telecommunication system wherein a plurality of terminals randomly access to a reverse common channel, comprising:

means for receiving state information broadcasted from the base station, the state information representing that a code synchronization of the data packet is acquired in the base station, wherein a code synchronization detection is performed based on a preamble of the data packet transmitted from the terminals through the reverse common channel; and data transmission determination means for determining whether the code synchronization of the data packet is acquired or not based on the state information, allowing the terminal to transmit the data packet in the same time slot as the data packet of which the code synchronization is acquired if the code synchronization of the data packet is acquired, and allowing the terminal to stop transmission of the data packets if the code synchronization of the data packet is not acquired.]

[35. A terminal for transmitting a data packet to a base station in a code division multiple access (CDMA) telecommunication system wherein a plurality of terminals randomly access to a reverse common channel, comprising:

a data generator for generating data packets to be transmitted to the base station;

a data transmitter for transmitting the data packets generated in said data generator;

a terminal RF signal processor for converting the data packets from said data transmitter into a radio frequency (.RF) signal and for processing an RF signal received from the base station;

a broadcast signal receiver for receiving a broadcast signal from said terminal RF signal processor, the broadcast signal representing that a code synchronization of the data packet is acquired in the base station, wherein a code synchronization detection is performed based on a preamble of the data packet transmitted from the terminals through the reverse common channel; and data transmission determination circuit for determining whether the code synchronization of the data packet is acquired or not based on the broadcast signal, allowing the data transmitter to continue to transmit the data packet if the code synchronization of the data packet is acquired, and allowing the data transmitter to stop transmission of the data packets if the code synchronization of the data packet is not acquired.]

[36. The terminal as recited in claim 35, wherein the data transmitter is designed to have a transmitted data unit consisting of the preamble and user's data, and the power of the preamble is set different from that of the user's data.]

[37. A base station for making a plurality of terminals have a random access to a reverse common channel in a code division multiple access (CDMA) system, comprising:

a base station RF signal processor for receiving an RF signal transmitted from the terminal;

a data transceiver for demodulating the RF signal from said base station RF signal processor and generating a data packet to deliver it to an upper hierarchy or another network or vice versa, generating a signal representing whether a code synchronization of the data packet is acquired or not;

a detection determination means for determining whether the data packet is acquired or not upon completing a preamble of the data packet;

a broadcast determination means for determining information representing that the code synchronization of the data packet is acquired, to be broadcasted to the terminals if the code synchronization of the data packet is acquired; and a broadcast transmitter for controlling the information representing that the code synchronization of the data packet is acquired, to be broadcasted to the terminals at a predetermined power level in a predetermined time.]

[38. The base station as recited in claim 37, wherein said detection determination means determines the initial code synchronization and the tracking of the synchronization in a given time before completion of a preamble transmission to make said terminals perform the precise operation in the beginning of the slot.]

[39. The base station as recited in claim 37, wherein said detection determination means searches the codes around the beginning of each time slot for a duration that may vary from the length of the time slot to the length of the preamble.]

[40. The base station as recited in claim 39, wherein said broadcast determination means determines the broadcast signal only with a single bit representing the detection of the synchronization in the preamble.]

[41. The base station as recited in claim 39, wherein said broadcast transmitter transmits the broadcast signal determined by said broadcast determination means through an additional channel using a different code other than the presently used code at every time of completing the slot.]

[42. The base station as defined in claim 39, wherein said broadcast transmitter transmits the broadcast signal determined by said broadcast determination means at every time of completing the slot in the punctured form having the power control bit transmitted through the pilot channel and a time offset.]

[43. A method for transmitting a data packet to a base station in a code division multiple access (CDMA) telecommunication system wherein a plurality of terminals randomly access to a reverse common channel, comprising the steps of:

a) receiving state information broadcasted from the base station, the state information representing that a code synchronization of the data packet is acquired in the base station, wherein a code synchronization detection is performed based on a preamble of the data packet transmitted from the terminals through the reverse common channel; and b) determining whether the code synchronization of the data packet is acquired or not based on the state information, allowing the terminal to transmit the data packet in the same time slot as the data packet of which the code synchronization is acquired if the code synchronization of the data packet is acquired, and allowing the terminal to stop transmission of the data packets if the code synchronization of the data packet is not acquired.]

[44. A method for transmitting a data packet to a base station in a code division multiple access (CDMA) telecommunication system wherein a plurality of terminals randomly access to a reverse common channel, comprising the steps of:

a) at a data generator, generating data packets to be transmitted to the base station;

b) at a data transmitter, transmitting the data packets generated in the data generator;

c) at a terminal RF signal processor, converting the data packets into a radio frequency (RF) signal and for processing an RF signal received from the base station;

d) at a broadcast signal receiver, receiving a broadcast signal from said terminal RF signal processor, the broadcast signal representing that a code synchronization of the data packet is acquired in the base station, wherein a code synchronization detection is performed based on a preamble of the data packet transmitted from the terminals through the reverse common channel; and e) at data transmission determination means, determining whether the code synchronization of the data packet is acquired or not based on the broadcast signal, allowing the data transmitter to continue to transmit the data packet if the code synchronization of the data packet is acquired, and allowing the data transmitter to stop transmission of the data packets if the code synchronization of the data packet is not acquired.]

[45. The method as recited in claim 44, wherein the data packet includes the preamble and user's data, and the power of the preamble is set different from that of the user's data.]

[46. A method for making a plurality of terminals have a random access to a reverse common channel in a code division multiple access (CDMA) system, comprising:

a) at a base station RF signal processor, receiving an RF signal transmitted from the terminal;

b) at a data transceiver, demodulating the RF signal from said base station RF signal processor and generating a data packet to deliver it to an upper hierarchy or another network or vice versa, generating a signal representing whether a code synchronization of the data packet is acquired or not;

c) at a detection determination means, determining whether the data packet is acquired or not upon completing a preamble of the data packet;

d) at a broadcast determination means, determining information representing that the code synchronization of the data packet is acquired, to be broadcasted to the terminals if the code synchronization of the data packet is acquired; and d) at a broadcast transmitter, for controlling the information representing that the code synchronization of the data packet is acquired, to be broadcasted to the terminals at a predetermined power level in a predetermined time.]

[47. The method as recited in claim 46, wherein in the step c) the codes are searched around the beginning of each time slot for a duration that may vary from the length of the time slot to the length of the preamble.]

*48. A method for wireless communication comprising:*

*transmitting from a first user equipment a first preamble in a first time slot using a reverse common channel;*

*transmitting from a second user equipment a second preamble in the first time slot using the reverse common channel;*

*receiving the first preamble at a base station;*

*processing, at the base station, the received first preamble to determine whether a code synchronization is acquired or not;*

*generating, at the base station, a broadcast signal based on the determination of whether a code synchronization is acquired or not;*

*broadcasting the broadcast signal at the base station;*

*receiving the broadcast signal at the first user equipment;*

*deciding, at the first user equipment, to transmit first user data associated with the first preamble based on the received broadcast signal;*

*receiving the broadcast signal at the second user equipment; and*

*deciding, at the second user equipment, to transmit second user data associated with the first preamble based on the received broadcast signal.*

*49. The method of claim 48, wherein the broadcast signal is indistinctive between at least the first user equipment and the second user equipment.*

*50. The method of claim 49, wherein the first preamble is indistinctive between at least the first user equipment and the second user equipment.*

*51. The method of claim 48, wherein the first preamble is indistinctive between at least the first user equipment and the second user equipment.*

*52. The method of claim 48, wherein the broadcast signal is received by the first user equipment in a second time slot and the broadcast signal is received by the second user equipment in the second time slot.*

*53. The method of claim 52, further comprising:*

*transmitting from the first user equipment the first user data in a third time slot; and*

*transmitting from the second user equipment the second user data in the third time slot.*

*54. The method of claim 48, further comprising:*

*transmitting from the first user equipment the first user data in a third time slot; and*

*transmitting from the second user equipment the second user data in the third time slot.*

*55. A communication device comprising:*

*a receiver configured to receive a preamble transmitted from a first terminal using a reverse common channel;*

*a control unit configured to process the preamble to determine whether a code synchronization is acquired or not;*

*a broadcast determination circuit configured to generate a broadcast signal based on the determination of whether a code synchronization is acquired or not; and*

*a broadcast transmitter configured to broadcast the broadcast signal, wherein the broadcast signal allows the first terminal to determine whether or not to transmit first user data associated with the preamble.*

*56. The communication device of claim 55, wherein the broadcast signal is indistinctive between at least two terminals including the first terminal.*

*57. The communication device of claim 56, wherein the preamble is indistinctive between at least two terminals including the first terminal.*

*58. The communication device of claim 55, wherein the preamble is indistinctive between at least two terminals including the first terminal.*

*59. The communication device of claim 55, wherein the preamble is received at the communication device in a first time slot and the broadcast signal that makes the first terminal transmit the first user data is broadcasted only at a specific time that is a predetermined time interval after the beginning of the first time slot.*

*60. The communication device of claim 55, wherein the broadcast signal allows a second terminal to determine whether or not to transmit second user data.*

*61. The communication device of claim 55, wherein the preamble is received at the communication device in a first time slot and the broadcast signal that causes the first terminal to transmit the first user data is broadcasted only at a specific time that is a predetermined time interval after the beginning of the first time slot.*

*62. The communication device of claim 61, wherein the broadcast signal causes a second terminal to transmit second user data.*

*63. The communication device of claim 61, wherein the broadcast signal is indistinctive between at least two terminals including the first terminal.*

*64. The communication device of claim 63, wherein the preamble is indistinctive between at least two terminals including the first terminal.*

*65. The communication device of claim 61, wherein the preamble is indistinctive between at least two terminals including the first terminal.*

*66. A communication system comprising:*

*a preamble transmitter in a first user equipment configured to transmit a first preamble in a first time slot using a reverse common channel;*

*a receiver in a base station configured to receive the first preamble;*

*a control unit in the base station configured to process the received first preamble to determine whether a code synchronization is acquired or not;*

*a broadcast determination circuit in the base station configured to generate a broadcast signal based on the determination of whether a code synchronization is acquired or not;*

*a broadcast transmitter in the base station configured to broadcast the broadcast signal; and*

*a broadcast receiver in the first user equipment configured to receive the broadcast signal, wherein the first user equipment decides whether or not to transmit first user data associated with the first preamble based on the received broadcast signal.*

*67. The communication system of claim 66, wherein the broadcast signal is indistinctive between at least two user equipments including the first user equipment.*

*68. The communication system of claim 67, wherein the first preamble is indistinctive between at least two user equipments including the first user equipment.*

*69. The communication system of claim 66, wherein the first preamble is indistinctive between at least two user equipments including the first user equipment.*

*70. The communication system of claim 66, wherein the broadcast signal which makes the first user equipment transmit the first user data is received by the first user equipment only at a specific time that is a predetermined time interval after the beginning of the first time slot.*

*71. The communication system of claim 66, wherein the broadcast signal allows a second user equipment to decide whether or not to transmit second user data.*

*72. The communication system of claim 66, wherein the broadcast signal which causes the first user equipment to transmit the first user data is received by the first user equipment only at a specific time that is a predetermined time interval after the beginning of the first time slot.*

*73. The communication system of claim 72, wherein the broadcast signal causes a second user equipment to transmit second user data.*

*74. The communication system of claim 73, wherein the first user data and the second user data are transmitted in a second time slot.*

*75. The communication system of claim 74, wherein the second user equipment transmits a second preamble associated with the second user data in the first time slot using the reverse common channel.*

*76. The communication system of claim 72, wherein the broadcast signal is indistinctive between at least two user equipments including the first user equipment.*

*77. The communication system of claim 76, wherein the first preamble is indistinctive between at least two user equipments including the first user equipment.*

*78. The communication system of claim 72, wherein the first preamble is indistinctive between at least two user equipments including the first user equipment.*

*79. A method for operating a base station, comprising:*

*receiving a preamble transmitted from a first terminal using a reverse common channel;*

*processing the received preamble to determine whether a code synchronization is acquired or not;*

*generating a broadcast signal based on the determination of whether a code synchronization is acquired or not; and*

*broadcasting the broadcast signal, wherein the broadcast signal allows the first terminal to determine whether or not to transmit first user data associated with the preamble.*

*80. The method of claim 79, wherein the broadcast signal is indistinctive between at least two terminals including the first terminal.*

*81. The method of claim 80, wherein the preamble is indistinctive between at least two terminals including the first terminal.*

*82. The method of claim 79, wherein the preamble is indistinctive between at least two terminals including the first terminal.*

*83. The method of claim 79, wherein the preamble is received in a first time slot and the broadcast signal that makes the first terminal transmit the first user data is broadcasted only at a specific time that is a predetermined time interval after the beginning of the first time slot.*

*84. The method of claim 79, wherein the broadcast signal allows a second terminal to determine whether or not to transmit second user data.*

*85. The method of claim 79, wherein the preamble is received in a first time slot and the broadcast signal that causes the first terminal to transmit the first user data is broadcasted only at a specific time that is a predetermined time interval after the beginning of the first time slot.*

*86. The method of claim 85, wherein the broadcast signal causes a second terminal to transmit second user data.*

*87. The method of claim 85, wherein the broadcast signal is indistinctive between at least two terminals including the first terminal.*

*88. The method of claim 87, wherein the preamble is indistinctive between at least two terminals including the first terminal.*

*89. The method of claim 85, wherein the preamble is indistinctive between at least two terminals including the first terminal.*

*90. A method for wireless communication comprising:*

*transmitting from a first user equipment a first preamble in a first time slot using a reverse common channel;*

*receiving the first preamble at a base station;*

*processing, at the base station, the received first preamble to determine whether a code synchronization is acquired or not;*

*generating, at the base station, a broadcast signal based on the determination of whether a code synchronization is acquired or not;*

*broadcasting the broadcast signal at the base station;*

*receiving the broadcast signal at the first user equipment; and*

*deciding, at the first user equipment, whether or not to transmit first user data associated with the first preamble based on the received broadcast signal.*

*91. The method of claim 90, wherein the broadcast signal is indistinctive between at least two user equipments including the first user equipment.*

*92. The method of claim 91, wherein the first preamble is indistinctive between at least two user equipments including the first user equipment.*

*93. The method of claim 90, wherein the first preamble is indistinctive between at least two user equipments including the first user equipment.*

*94. The method of claim 90, wherein the broadcast signal which makes the first user equipment transmit the first user data is received at the first user equipment only at a specific time that is a predetermined time interval after the beginning of the first time slot.*

*95. The method of claim 90, further comprising:*

*receiving the broadcast signal at a second user equipment; and*

*deciding, at the second user equipment, whether or not to transmit second user data based on the received broadcast signal.*

*96. The method of claim 90, wherein the broadcast signal which causes the first user equipment to transmit the first user data is received at the first user equipment only at a specific time that is a predetermined time interval after the beginning of the first time slot.*

*97. The method of claim 96, further comprising:*

*receiving the broadcast signal at a second user equipment at the specific time; and*

*deciding, at the second user equipment, to transmit second user data based on the received broadcast signal.*

*98. The method of claim 96, wherein the broadcast signal is indistinctive between at least two user equipments including the first user equipment.*

*99. The method of claim 98, wherein the first preamble is indistinctive between at least two user equipments including the first user equipment.*

*100. The method of claim 96, wherein the first preamble is indistinctive between at least two user equipments including the first user equipment.*

* * * * *